United States Patent
Zeng

(10) Patent No.: US 11,047,986 B2
(45) Date of Patent: *Jun. 29, 2021

(54) GPS TRACKING SYSTEM

(71) Applicant: ANYTREK CORPORATION, Ontario, CA (US)

(72) Inventor: Haijian Zeng, Shenzhen (CN)

(73) Assignee: ANYTREK CORPORATION, Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,498

(22) Filed: Dec. 10, 2019

(65) Prior Publication Data
US 2020/0142077 A1 May 7, 2020

Related U.S. Application Data

(63) Continuation of application No. 15/796,660, filed on Oct. 27, 2017, now Pat. No. 10,539,678, which is a continuation of application No. 15/433,979, filed on Feb. 15, 2017, now Pat. No. 9,835,728.

(51) Int. Cl.
| | |
|---|---|
| *G01S 19/16* | (2010.01) |
| *B60Q 1/30* | (2006.01) |
| *G01S 19/42* | (2010.01) |
| *F21S 43/19* | (2018.01) |
| *F21S 43/14* | (2018.01) |
| *F21S 43/20* | (2018.01) |
| *B60Q 1/00* | (2006.01) |
| *B60Q 1/26* | (2006.01) |
| *F21S 43/15* | (2018.01) |

(52) U.S. Cl.
CPC ............ *G01S 19/16* (2013.01); *B60Q 1/0017* (2013.01); *B60Q 1/0023* (2013.01); *B60Q 1/263* (2013.01); *B60Q 1/2696* (2013.01); *B60Q 1/305* (2013.01); *F21S 43/14* (2018.01); *F21S 43/15* (2018.01); *F21S 43/19* (2018.01); *F21S 43/195* (2018.01); *F21S 43/26* (2018.01); *G01S 19/42* (2013.01)

(58) Field of Classification Search
CPC ....... G01S 19/16; G01S 19/42; B60Q 1/0023; B60Q 1/263; B60Q 1/2696; B60Q 1/0017; B60Q 1/305; F21S 43/19; F21S 43/15; F21S 43/195; F21S 43/14; F21S 43/26
USPC ..................................... 342/357.54
See application file for complete search history.

(56) References Cited

U.S. PATENT DOCUMENTS

| | | |
|---|---|---|
| 3,065,342 A | 11/1962 | Worden |
| 6,166,637 A | 12/2000 | Cyr |
| 6,166,638 A | 12/2000 | Brady |
| 8,009,364 B2 | 8/2011 | Sassoon |
| 8,717,679 B2 | 5/2014 | Sassoon |

(Continued)

FOREIGN PATENT DOCUMENTS

EP  2421091 A1  2/2012

*Primary Examiner* — Frank J McGue
(74) *Attorney, Agent, or Firm* — Klein, O'Neill & Singh, LLP

(57) ABSTRACT

An LED taillight with an integrated GPS tracking system is disclosed therein. The GPS tracking system is hidden behind the LED portion of the LED taillight so that the GPS tracking system is not noticeable by someone inspecting a trailer on which the LED taillight is installed. Additionally, power sent to the LED taillight to power the LEDs also recharge a battery associated with the GPS tracking system and power the GPS tracking system during use.

19 Claims, 13 Drawing Sheets

(56) References Cited

U.S. PATENT DOCUMENTS

| | | |
|---|---|---|
| 9,432,068 B2 | 8/2016 | StÄHlin |
| 9,835,728 B1 * | 12/2017 | Zeng .................... B60Q 1/0017 |
| 10,539,678 B2 * | 1/2020 | Zeng .................... B60Q 1/0017 |
| 2013/0069776 A1 | 3/2013 | Haber |
| 2015/0247606 A1 | 9/2015 | Gerlach |

* cited by examiner

GPS TRACKING SYSTEM

CROSS-REFERENCE TO RELATED APPLICATIONS

This application is a continuation application of U.S. patent application Ser. No. 15/796,660, filed on Oct. 27, 2017, which is a continuation application of U.S. patent application Ser. No. 15/433,979, filed on Feb. 15, 2017, now U.S. Pat. No. 9,835,728, the entire contents of which are all expressly incorporated herein by reference.

STATEMENT RE: FEDERALLY SPONSORED RESEARCH/DEVELOPMENT

Not Applicable

BACKGROUND

The various aspects described herein relate to a covert GPS tracking system associated with the rear taillight of the trailer.

There are a significant number of commercial trailers in the United States. The trailers are loaned and borrowed amongst a fleet of vehicles and are parked at various locations within an area. Because of the sheer volume of commercial trailers in the United States, it is difficult to keep track of the trailers. Moreover, since the commercial trailers are not specifically associated or permanently coupled with any particular registered vehicle, the trailers can be more easily stolen by a thief.

Accordingly, there is a need in the art for addressing certain deficiencies in relation to the security and monitoring of commercial trailers.

BRIEF SUMMARY

A LED (Light Emitting Diode) taillight with integrated GPS tracking system is disclosed herein. The LED taillight has a small package in relation to its depth because the LED does not require a parabolic reflector behind the LED to redirect light that is directed backwards to the front. Because the LED portion of the LED taillight does not take a significant amount of space in relation to its depth, the GPS tracking system is attached to the back side of the LED layer. The GPS tracking system is used to track the vehicle to which the LED taillight with integrated GPS tracking system is mounted to. The vehicle may be a commercial trailer, truck or any other vehicle that needs to be tracked. The LED taillight operates in the same manner as an incandescent rear taillight. Moreover, the power from the vehicle not only operates the LED taillight but also charges a rechargeable battery associated with the GPS tracking system and operation of the GPS tracking system during use. Because the GPS tracking system is behind the LED and is not visible from an external inspection of the vehicle and no equipment is externally mounted to the vehicle or trailer so as to be visible by someone walking around the trailer vehicle, the LED taillight hides the GPS tracking system so that a thief does not know that the trailer has the GPS tracking system.

More particularly, a GPS tracking system for a truck and commercial trailer is disclosed. The system may comprise a semitransparent red lamp cover, a LED PCBA (Printed Circuit Board Assembly), GPS tracker PCBA, recharging circuit, rechargeable battery, and three pin connector. The semitransparent red lamp cover may be sized and configured to fit a rubber grommet or a metallic or rigid mounting ring of an incandescent 4" round rear brake and turn light. The LED PCBA may be specifically designed to allow maximum reception and transmission of RF (Radio Frequency) em-waves (electromagnetic waves) used by the GPS tracker PCBA behind it in order to guarantee the best performance of GPS reception and cellular communication. The LEDs may be disposed immediately adjacent to the lamp cover on the LED PCBA so that light from the LEDs is transmitted through the lamp cover and projects a red light when the LEDs emit light. The electrical-conductive tracks may be formed on the LED PCBA for connecting the LEDs to power. The GPS tracker PCBA may have a GPS antenna mounted on it. The LEDs and the electrical-conductive tracks on the LED PCBA may be carefully designed to avoid overlapping or at least not significantly overlapping with the GPS antenna reception area so that the GPS performance could be guaranteed. The LEDs are connected directly to the power inlet by the three pin connector so that the lamp function can work independently. The rechargeable battery is connected to the three pin connector via a recharging circuit. The first pin of the three pin connector may be electrically connectable to a tail light pin. The second pin of the three pin connector may be connectable to a brake light of the tail light pin so that the rechargeable battery is recharged when a taillight is turned on or when the user is braking.

A material of the LED PCBA may be plastic, polyester or FR-4 epoxy glass.

The LEDs and the electrical-conductive tracks do not overlap the GPS antenna reception area.

In another aspect, a taillight for a truck trailer with an integrated GPS tracking system self-containable within a taillight socket of the truck trailer is disclosed. The taillight may comprise a semitransparent red lamp cover, LED PCBA, GPS tracker PCBA, recharging circuit, rechargeable battery, and a three pin connector. The semitransparent red lamp cover may be sized and configured to fit a rubber mounting grommet or a metallic or rigid mounting ring of an incandescent rear brake and turn light. The LEDs may be disposed immediately adjacent to the lamp cover so that light from the LEDs is transmitted through the lamp cover and projects a red light when the LEDs emit light. The LEDs are connected directly to the power inlet by the three pin connector so that the lamp function can work independently. The rechargeable battery is connected to the three pin connector via a recharging circuit. The first pin of the three pin connector may be electrically connectable to a tail light pin. The second pin of the three pin connector may be connectable to a brake light of the tail light pin so that the rechargeable battery is recharged when a taillight is turned on or when the user is braking. The taillight and the GPS tracking system may fit entirely within an existing taillight socket for an incandescent light taillight of the truck trailer and configured to fit a rubber mounting grommet or metallic or rigid mounting ring of an incandescent rear brake and turn light.

In another aspect, a trailer for a truck is disclosed. The trailer may comprise the following components: a plurality of wheels and a platform with the plurality of wheels attached to the platform; passenger side and driver side rear light cavities; first and second rubber grommets or metallic or rigid mounting rings disposed within the passenger side and driver side rear light cavities; a covert GPS tracking system mounted to either of the passenger side or driver side rear light cavities via the first or second rubber grommets or metallic or rigid mounting rings; a rear tail and brake light mounted to the other one of the passenger side or driver side rear light cavities via the other one of the first or second rubber mounting grommets or metallic or rigid mounting rings.

The covert GPS tracking system may include a semitransparent red lamp cover sized and configured to fit a rubber mounting grommet or a metallic or rigid mounting ring of an incandescent rear brake and turn light; light emitting diodes disposed immediately adjacent to the lamp cover on a LED PCBA so that light from the LEDs is transmitted through the lamp cover and projects a red light when the LEDs emit light; The LEDs are connected directly to the power inlet by the three pin connector so that the lamp function can work independently; The rechargeable battery is connected to the three pin connector via a recharging circuit, the first pin electrically connectable to a tail light pin and the second pin connectable to a brake light of the tail light pin so that the rechargeable battery is recharged when a taillight is turned on or when the user is braking.

The rear tail and brake light may have an identical configuration compared to the covert GPS tracking system mounted on the other side of the trailer so that the GPS tracking system can self-disguise as a common taillight.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
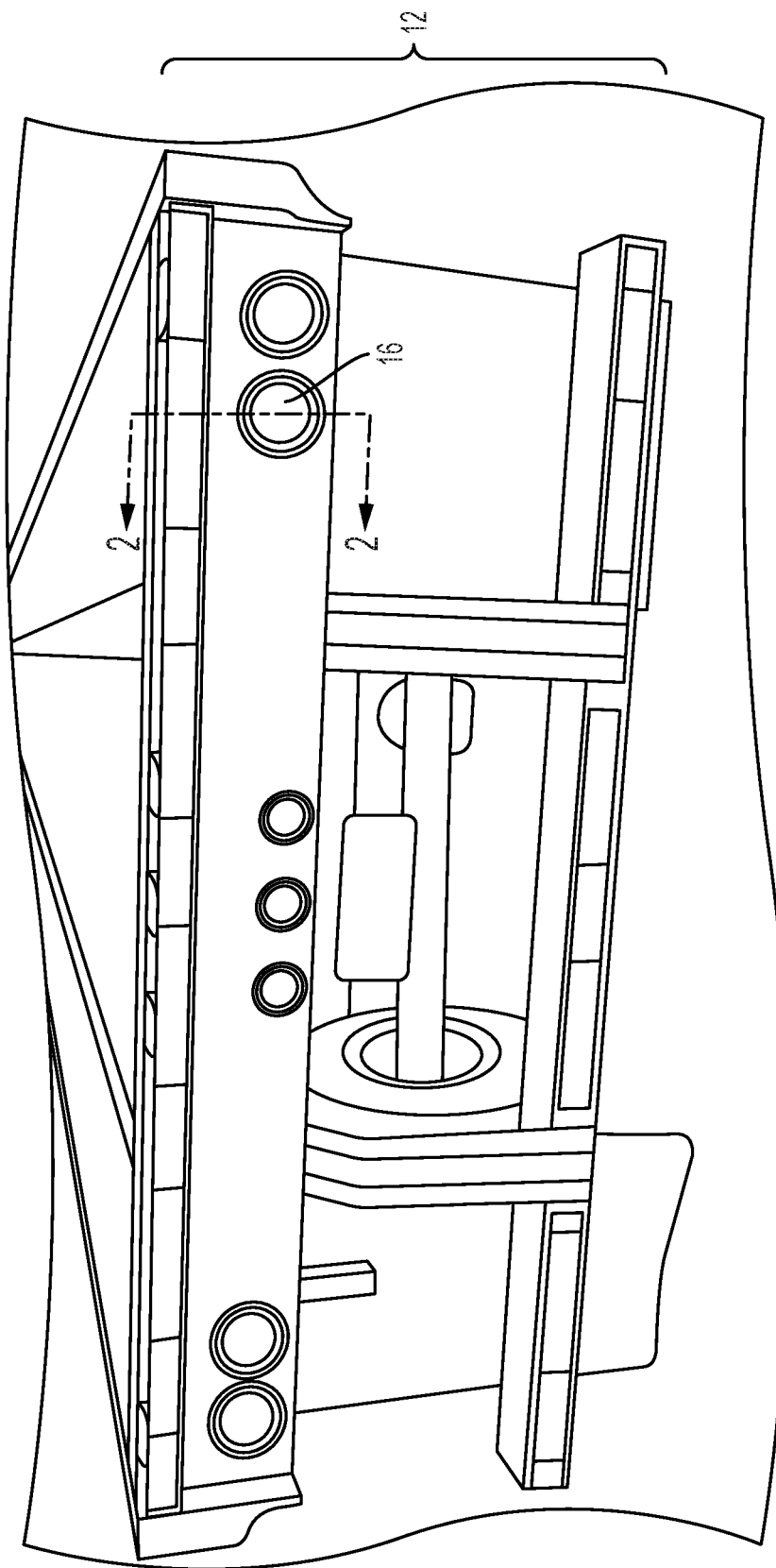
FIG. 1 is a back view of a trailer having an incandescent taillight.
Figure 2:
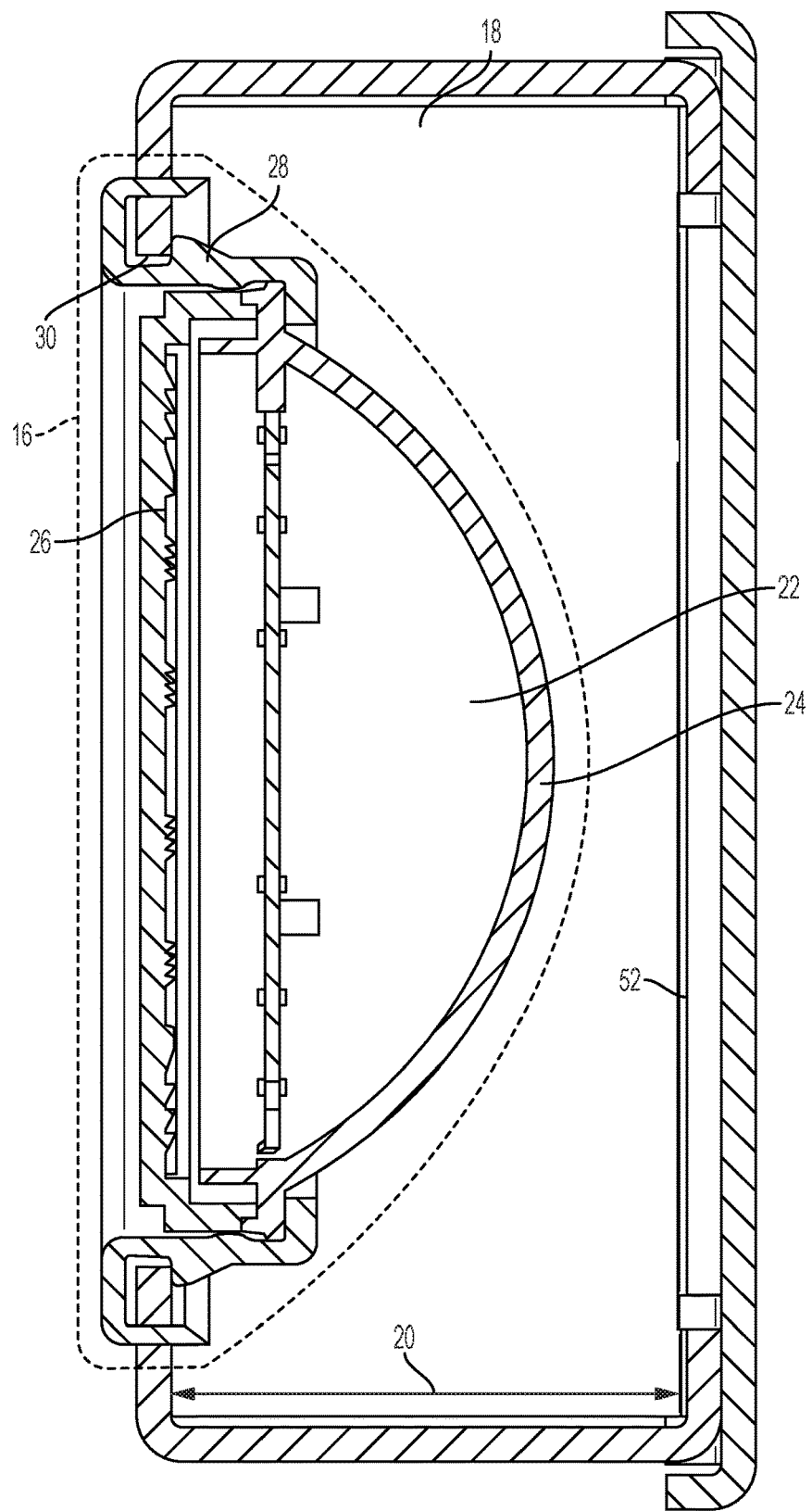
FIG. 2 is a cross-sectional view of the taillight shown in FIG. 1.
Figure 3:
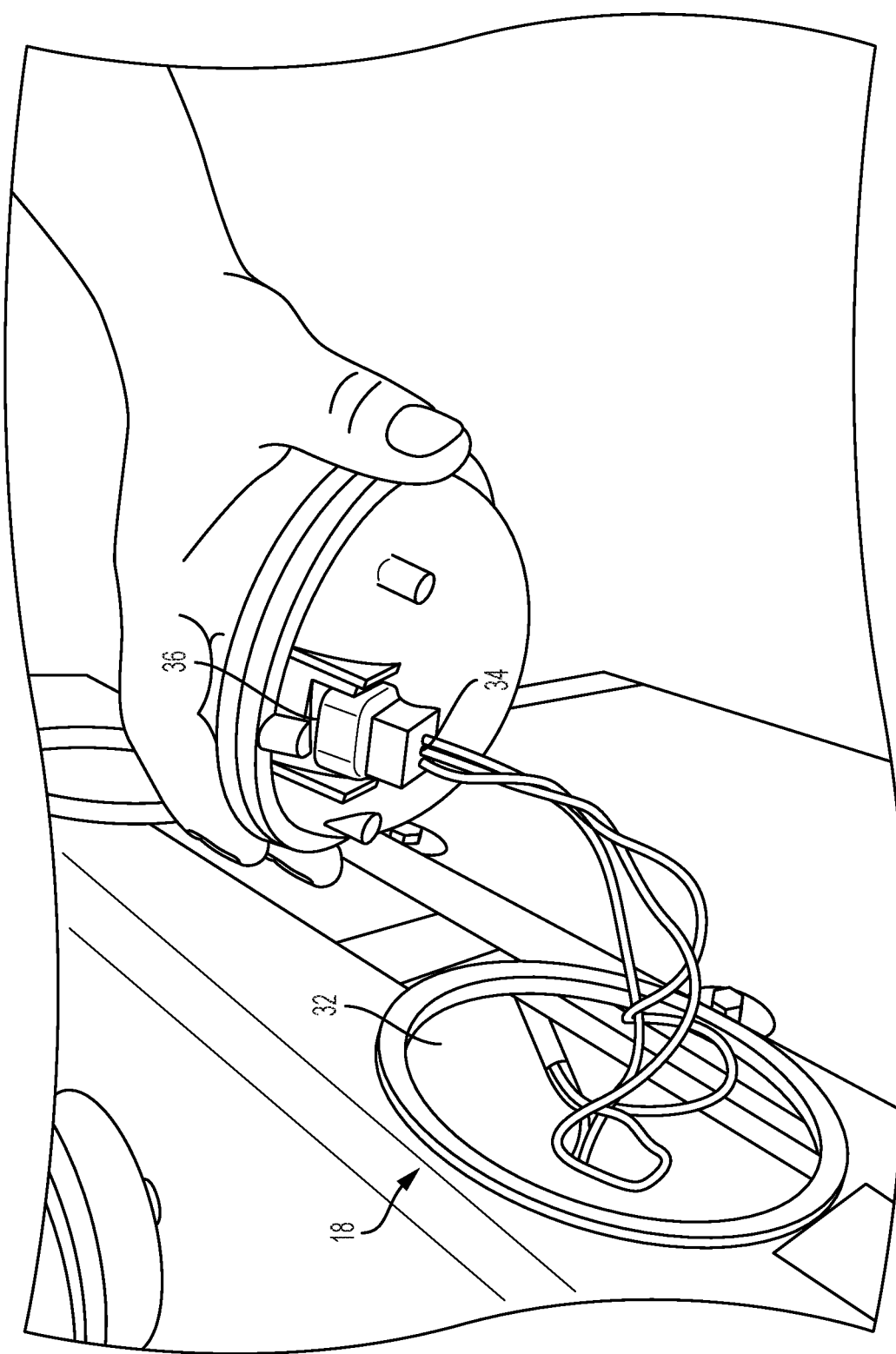
FIG. 3 is a perspective view of the taillight removed from the trailer.

Referring now to the drawings, a GPS tracking system 10 (see FIG. 6) may be incorporated into a taillight 14 and installed on a trailer 12 (see FIG. 1). The GPS tracking system 10 is not noticeable from an exterior inspection of the trailer 12. Accordingly, when a thief wants to steal the trailer 12, the thief would not know about the GPS tracking system.

The GPS tracking system 10 transmits position information (e.g. geographical coordinates) to a server so that an owner of the trailer 12 can locate the trailer 12 if it has been stolen or to find out the location of the trailer for one reason or another. In this regard, the GPS tracking system 10 includes a global positioning system and a receiver which receives signals from satellites regarding longitude, latitude and time information. The GPS tracking system 10 may also include a cellular modem for transmitting the current location of the trailer (i.e. GPS tracking system 10) to the server when the location of the trailer is needed. Additionally, the electronics of the GPS tracking system 10 is powered by a rechargeable battery. The taillight 14 receives power or electricity when the running lights of the truck are on, when the brake lights are activated and also when the side blinkers are activated. The electricity or power supply to the taillight 14 also charges the battery 38 (See FIG. 6) throughout the day and night during use of the trailer. During long distance drives when the truck is operational during nighttime, the battery 38 is recharged because the running lights of the truck are lit up. During short distance drives such as during the day, the battery 38 is recharged because the brake lights are frequently activated while driving even if the running lights of the truck are not on. The activation of the brake lights also charge the battery 38 during nighttime driving but the battery 38 is being primarily recharged because external lights of the truck are lit on. Moreover, because the GPS tracking system 10 is incorporated into a safety feature of the truck, namely, the taillight 14, a thief cannot merely break the GPS tracking system 10 because doing so would also make the taillight 14 inoperable and cause a police officer to pull the truck over for a broken taillight and catch the thief.

More particularly, referring now to FIGS. 1-7, an installation of the taillight 14 incorporating the GPS tracking system 10 is shown. The old taillight 16 is shown in FIG. 1. The old taillight 16 may be received into a taillight socket 18 (see FIG. 2) of the trailer 12. The socket 18 has a depth 20 that is sufficient to receive the incandescent bulb 22 and the parabolic reflector 24 that redirects light directed backwards through the red translucent cover 26 of the taillight 16. In order to install the new taillight 14 on the trailer 12 (see FIG. 5), a rubber mounting grommet 28 (see FIG. 2) mounted to the inner periphery 30 of an opening of the socket 18 is removed from the socket 18. Additionally, the old taillight 16 is removed from the rubber mounting grommet 28.

Figure 4:
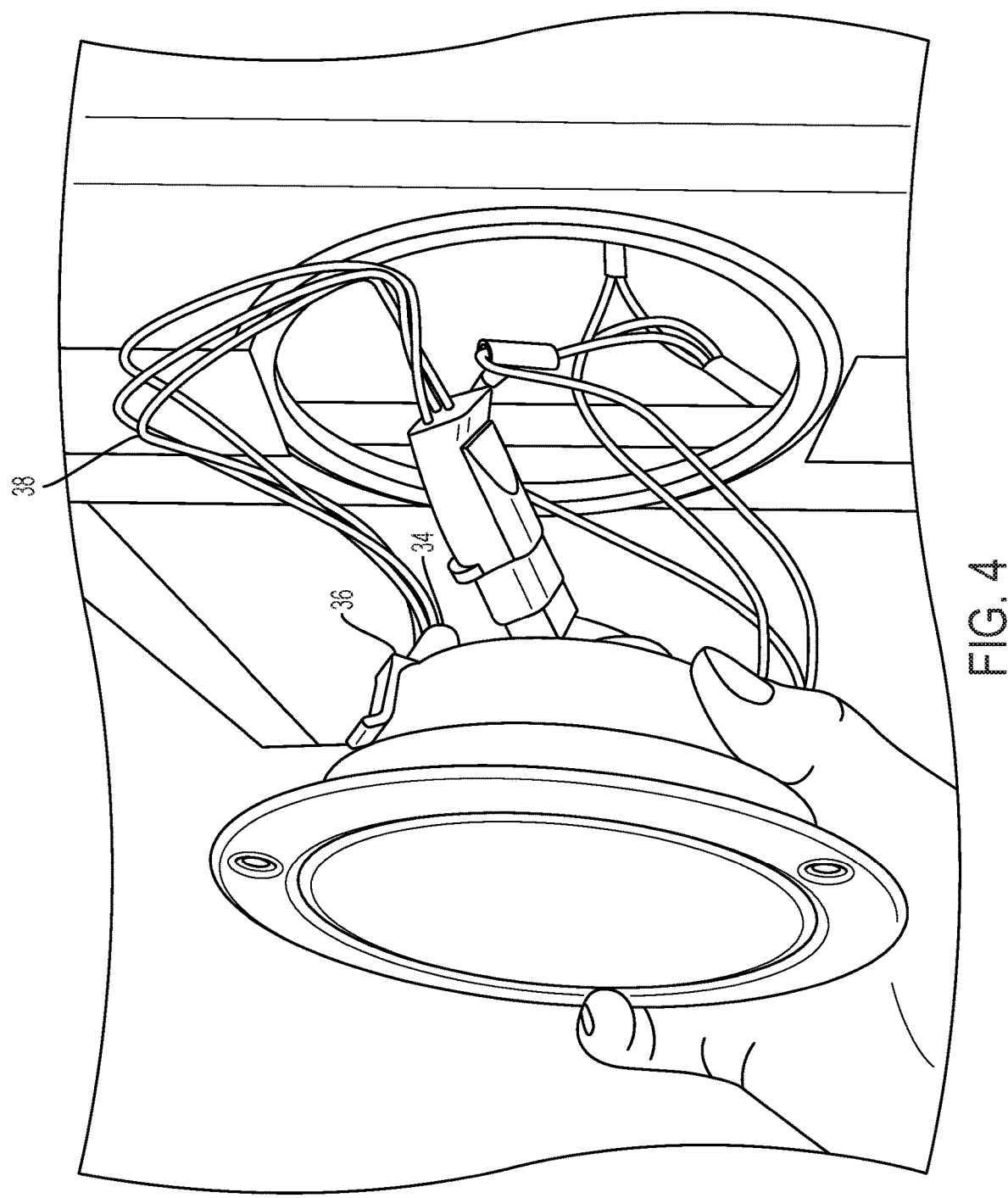
FIG. 4 is a perspective view of an LED taillight having a GPS tracking system integrated with the LED taillight electrically connected to the trailer.

With the rubber mounting grommet 28 removed from the opening 32 of the socket 18 and the old taillight 16 removed from the rubber mounting grommet 28, the old taillight 16 is disconnected from an electrical system of the trailer 12 powered by the truck. In particular, a wire loom 34 is removed from a pigtail connector 36 (see FIG. 3). Referring now to FIG. 4, the new taillight 14 is connected to the electrical system of the trailer 12 by connecting the wire loom 34 into the pigtail connector 36 of the new taillight 14. The taillight 14 may have any type of pigtail connector known in the art and are developed in the future as well as the wire loom 34. However, if the existing wire loom 34 on the trailer 12 is different from the pigtail connector 36 of the new taillight 14, the wires 38 of the wire loom 34 may be cut and a corresponding wire loom 34 to the pigtail connector 36 of the new taillight 14 may be spliced into the electrical system of the trailer 12. The new taillight 14 in relation to the red light emitting from the taillight 14 operates the same as the old taillight 16 when the running lights are on, turn lights are on or the brake lights are turned on. When the new taillight 14 is powered, the power also recharges the rechargeable battery 38 used to power the GPS tracking system 10 of the new taillight 14.

Figure 5:
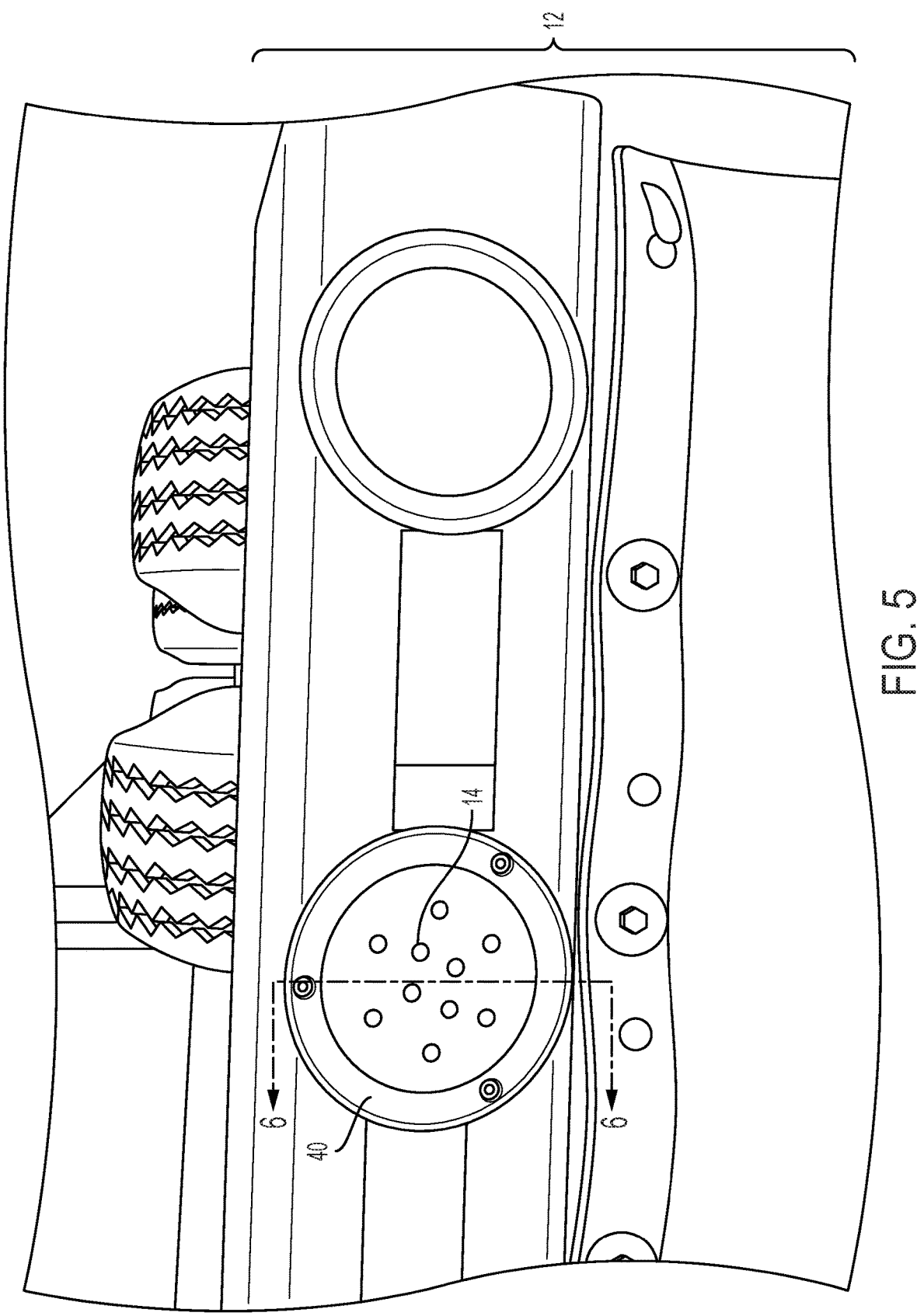
FIG. 5 is a back view of the trailer having the LED taillight with integrated GPS tracking system.

Referring now to FIG. 5, the new taillight 14 may be mounted to the socket 18 of the trailer 12 by utilizing the existing rubber mounting grommet 28 or alternatively as shown in FIG. 5, a metallic or rigid mounting ring 40 may be utilized in order to more securely attach the new taillight 14 to the socket 18.

Preferably, the existing rubber mounting grommet 28 is utilized in order to secure the taillight 14 to the trailer 12. This helps the taillight 14 to blend in with the trailer 12 and mitigates a thief from identifying the taillight 14 as a unique item or one where the GPS tracking system 10 may be located so that the thief could try to disable the GPS tracking system 10. However, it is also contemplated that the mounting ring 40 may also be utilized and yet still allow the taillight 14 to be unnoticeable to a thief. If the mounting ring 40 is utilized to mount the taillight 14 to the trailer 12, then all of the taillights may be replaced and the mounting ring 40 utilized to mount the taillights so that there is a level of uniformity amongst all of the taillights on the trailer.

Figure 6:
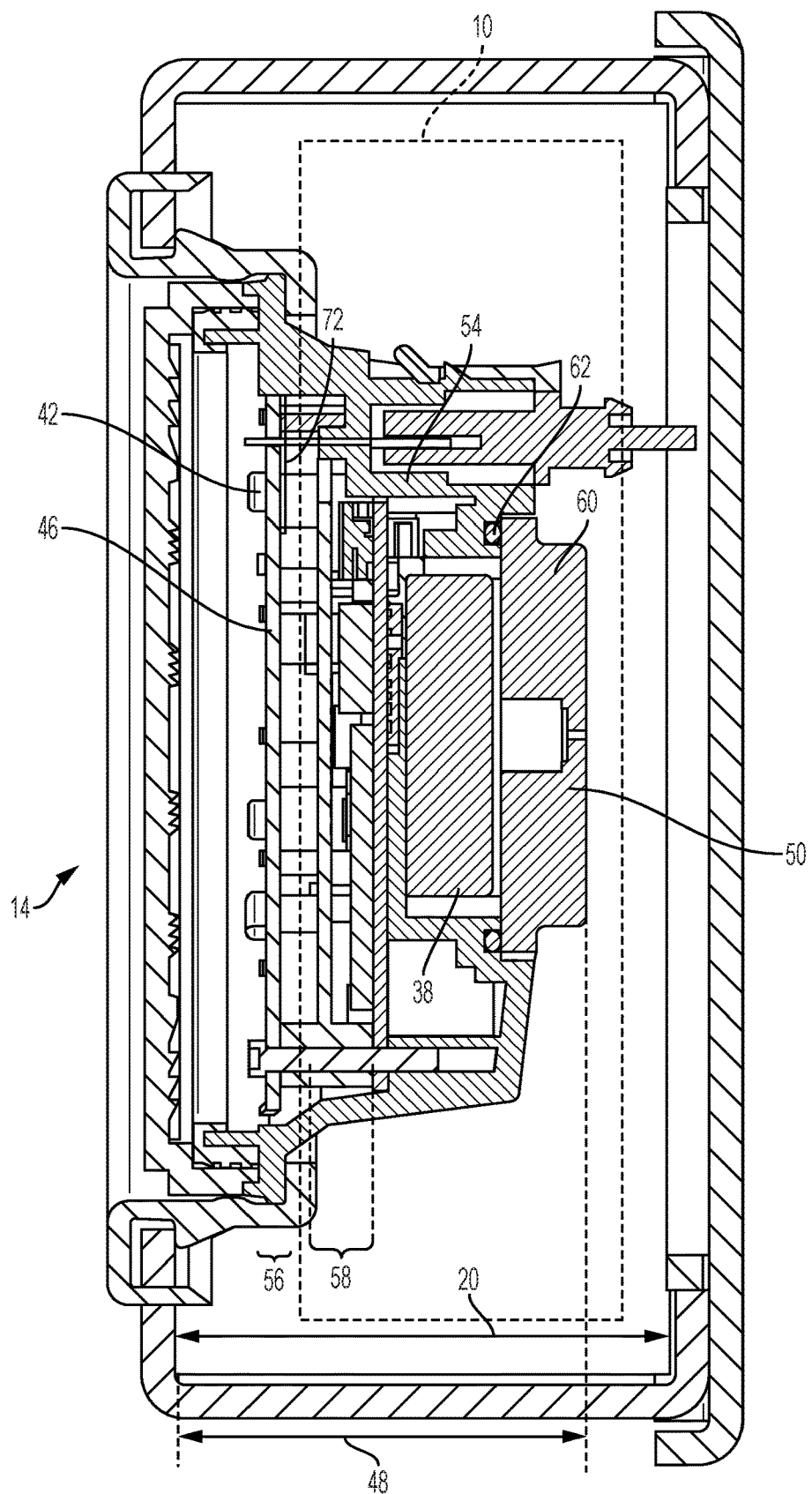
FIG. 6 is a cross-sectional view of the taillight shown in FIG. 5.

Referring now to FIG. 6, the taillight 14 may have a light emitting diode light source 42. Behind the light emitting diode light source, the taillight 14 may also have GPS tracking system 10. The LEDs of the LED light source 42 may be mounted to an opaque board 46. The LEDs may be visible from the exterior side of the taillight 14 but the electronics including but not limited to the GPS tracking system 10 is not visible from the exterior side of the taillight 14 so that the GPS tracking system 10 is not noticeable to a thief or an observer from the outside by one walking around the trailer 12. A thickness 48 of the taillight 14 as measured from an interior side of the socket 18 to a proximal end 50 of the taillight 14 may be less than a depth 20 from the interior side of the socket 18 to a far surface 52 of the socket 18. In this way, the LEDs being of a flat configuration which does not require a parabolic reflector as in the incandescent light bulb 22 taillight 16, provides additional space in the socket 18 for the GPS tracking system 10.

Figure 7:
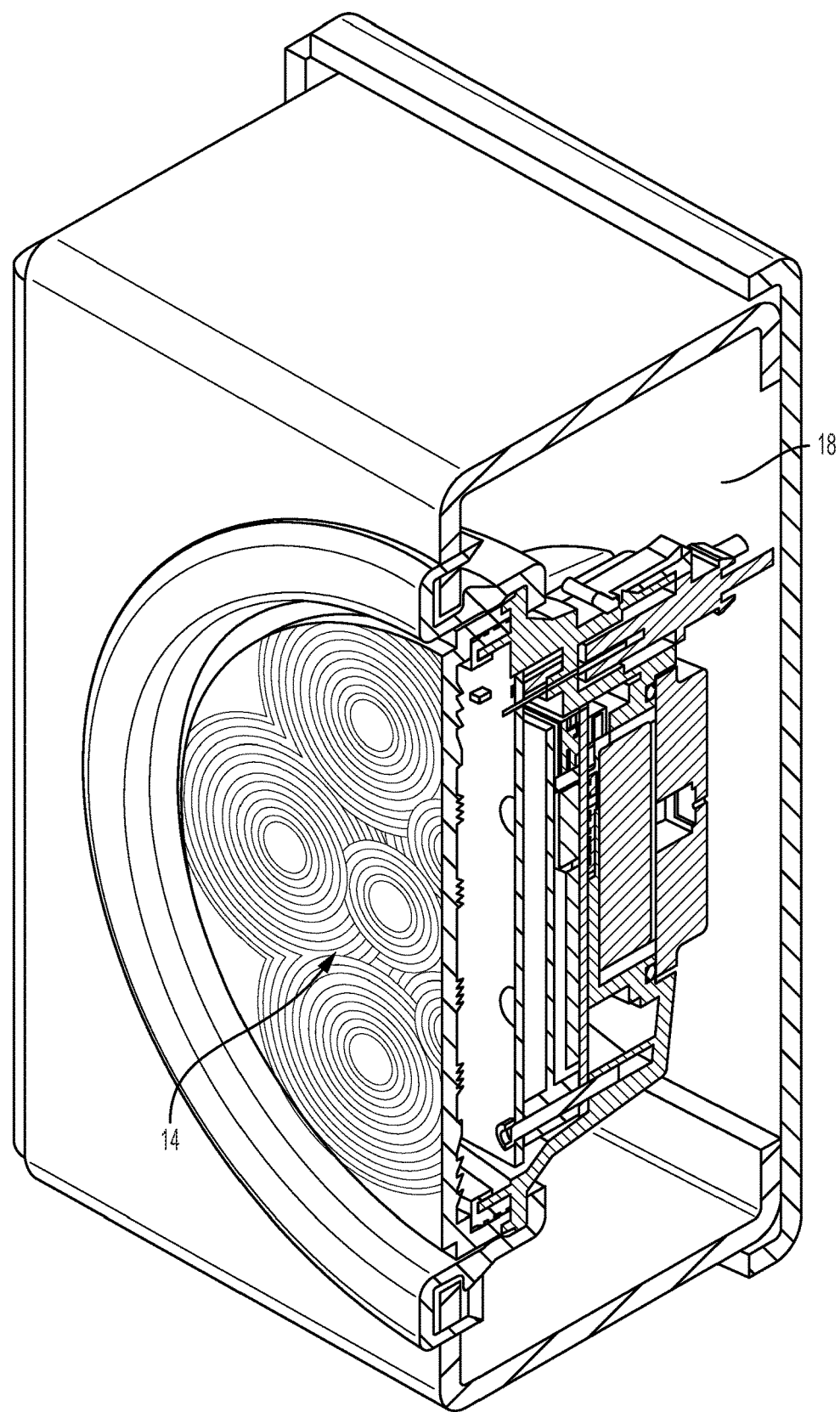
FIG. 7 is a perspective cross-sectional view of the taillight shown in FIG. 6.

Referring now to FIG. 7, a perspective cross-sectional view of the taillight 14 installed in the socket 18 of the trailer 12 is shown.

The trailer 12 may have one or two left taillights and one or two right taillights. The taillight 14 may be installed at one or all of the left taillights and/or one or all of the right taillights of the trailer 12. The GPS tracker PCBA 58 (see FIG. 3) is behind the LED PCBA 56, so if a thief wants to disable the GPS tracking system by smashing the device the LEDs will also be damaged. In this manner, if the thief disables the GPS tracking system 10 in order to steal the trailer 12, the lighting function of the taillight will malfunction and a police officer will stop the trailer for a broken taillight.

Figure 8:
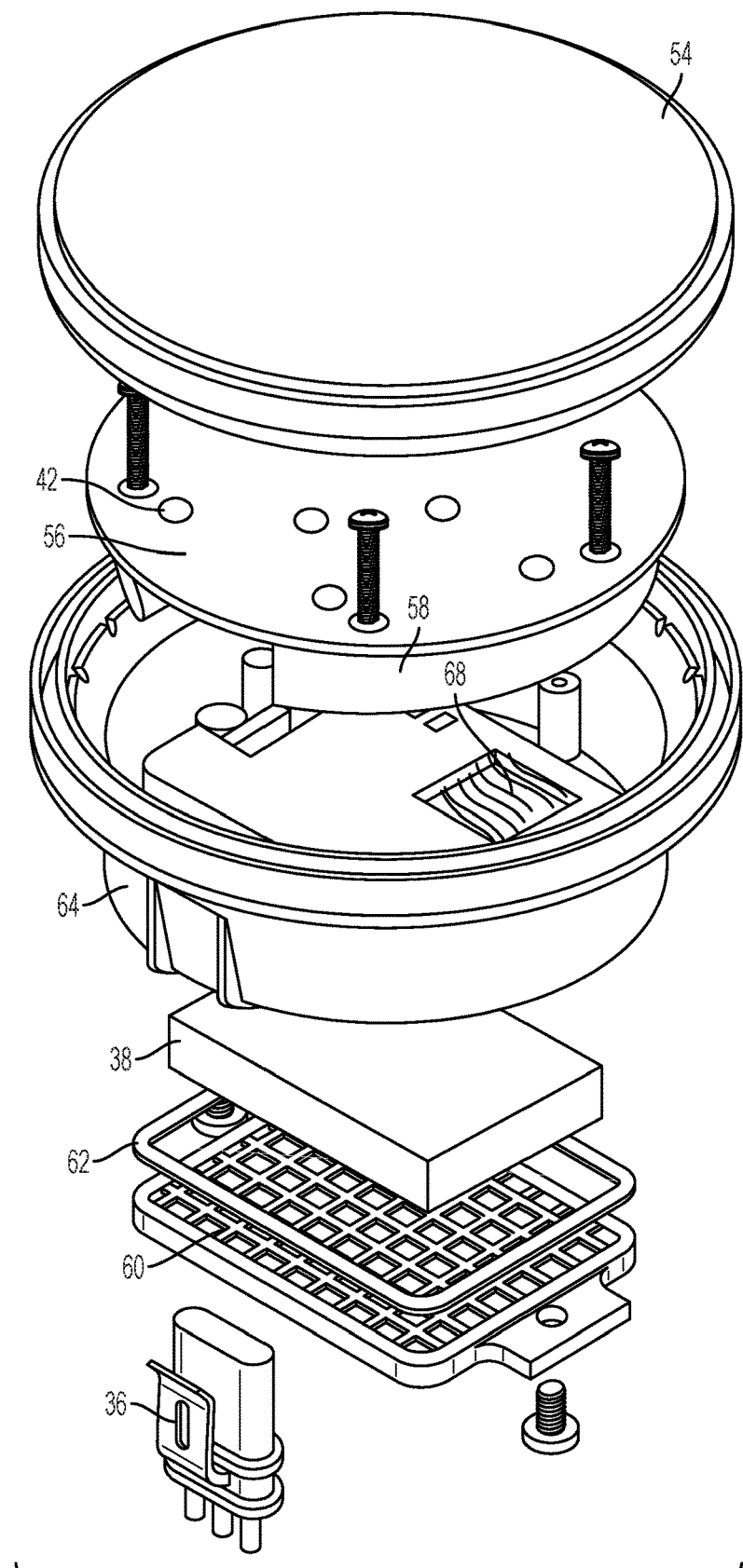
FIG. 8 illustrates an exploded perspective view of the LED taillight with integrated GPS tracking system.

Referring now to FIG. 8, the taillight 14 may include the LEDs, GPS tracking system 10 and a cellular modem housed within a standard round four (4) inch LED stop/turn/tail light use by heavy trucks and trailers. The taillight 14 may have a lens cover 54. The lens cover 54 may be a translucent red color so that when the LEDs are illuminated, the taillight 14 emits a red light. Additionally, the lens cover 54 may be transparent to radio frequency electromagnetic waves in order to guarantee a good reception of GPS signals from GPS satellites to a GPS antenna 68. Preferably, the lens cover 54 is circular and matches the lens cover of the old taillight 16 in order to blend in with the old taillights 16.

Immediately behind the lens cover 54 may be a LED PCBA 56 which may contain the LEDs 42 that illuminates the taillight 14.

Figure 13:
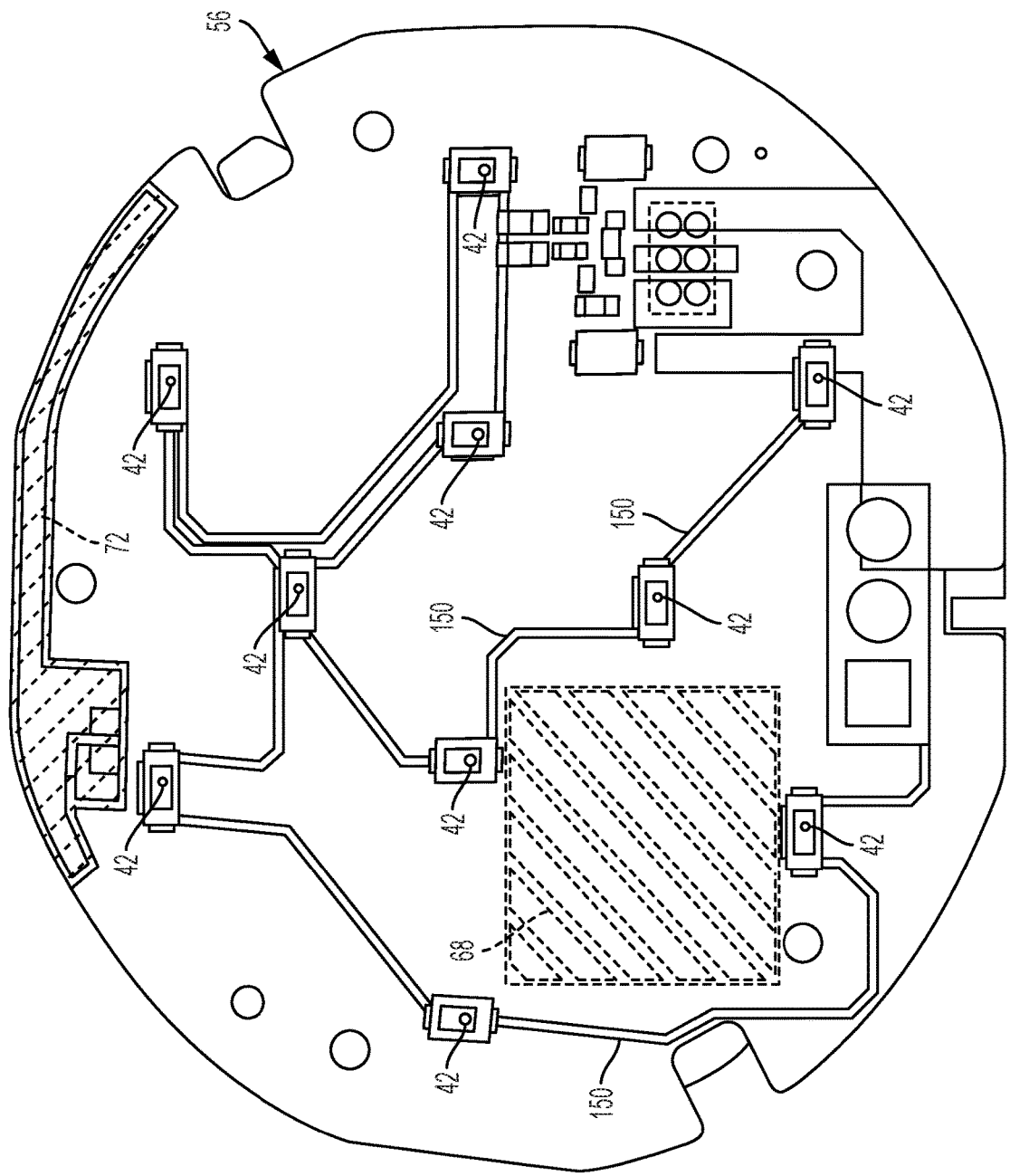
FIG. 13 is a top view of the LED PCBA with the cellular modem antenna formed on the LED mounting layer and illustrating a position of the GPS antenna reception area.

The LED PCBA 56 is shown in FIG. 13. The LED PCBA 56 may be fabricated from a material typical of a printed circuit board. By way of example and not limitation, the material of the LED PCBA 56 may be plastic, polyester, FR-4 glass epoxy or other materials that are known in the art or developed in the future so long as the material is transparent to radiofrequency electromagnetic waves. The transparency of the LED PCBA 56 to radiofrequency electromagnetic waves is so that the antenna 68 for receiving GPS signals and also for transmitting a cellular signal from the cellular antenna 72. The antenna 72 of the cellular modem may be formed on the LED PCBA top layer 56 as shown in FIG. 13 for the purposes of physically positioning the cellular antenna 72 as close to a plane of the opening 32 (see FIG. 3) of the taillight socket 18 and preferably on the outside of the plane of the opening 32 of the taillight socket 18.

Behind the LED PCBA 56, a GPS tracker PCBA 58 (see FIG. 8) may be located and comprise the GPS tracking system 10. The GPS tracker PCBA 58 may be one or more printed circuit boards stacked upon each other, or placed side-by-side with each other. The GPS tracker PCBA 58 may be utilized to mount the GPS antenna 68. The GPS antenna 68 may be a ceramic patch antenna 68. The antenna 68 is positioned behind the LED PCBA 56 so that the LEDs 42 do not overlap the antenna 68. Moreover, the copper tracks 150 do not overlap the antenna 68. Although it is shown and described that the LEDs 42 and the copper tracks 150 (see FIG. 13) on the LED PCBA 56 does not overlap the GPS antenna 68, it is also contemplated that the LEDs 42 and the copper tracks 150 may overlap and cover less than 50% or less, and more preferably less than 5% of the surface area of the antenna 68, if there is an overlap. The position of the antenna 68 on the PCBA layer in relation to the LEDs 42 and the copper tracks 150 on the LED mounting layer 56 may be adjusted so that the GPS antenna can have optimum reception of GPS signals.

The battery 38 may be located behind the GPS tracker PCBA 58 and be accessible by way of a battery cover 60 that has a weather seal 62 that interfaces with a housing 54 of the taillight 14 so that water and dust does not get into the housing 64 of the taillight 14 and disrupt operation of the taillight 14. The pigtail connector 36 may be secured to the housing 64 and may provide electrical communication to the electronics of the taillight 14.

The GPS tracker PCBA 58 (see FIG. 9) may include the GPS module 66 and a GPS antenna 68 which may be responsible for obtaining and processing the signals received from the orbiting GPS satellites. The output of the GPS module 66 and the GPS antenna 68 may be the latitude and longitude, speed, direction and time stamp for the current location of the taillight 14. The GPS tracker PCBA 58 may also include the cellular modem 70 and the cellular antenna 72 which may be connected to, and communicate on the cellular spectrum as broadcast from the cellular towers as placed by the various telecommunications providers. The GPS tracker PCBA 58 may also include a SIM card 74 which may contain a profile and configuration for a telecommunications provider provisioning a cellular service used by the cellular modem 70.

The GPS tracker PCBA 58 may also include a microcontroller module 76 (see FIG. 9) which may control the functioning, operation and data flow in the GPS tracking system 10. Firmware may reside in the microcontroller module 76 and instruct, interact and control the various components on the GPS tracker PCBA 58 and may ensure that the GPS tracking system 10 operates in the manner intended. A motion sensor 78 may be connected to the microcontroller 76. The motion sensor 78 may be a microchip containing movement sensors for at least one linear axis, and preferably all three linear axes. The motion sensor 78 may provide input to the microcontroller 76 whenever it 78 senses motion along any one of the three axes. The GPS tracker PCBA 58 may also include a flash memory module 80 which may provide dynamic memory storage for the microcontroller 76 to store working data, session parameters, session history, status of the other modules and received location data from the GPS module 66 if the cellular modem 70 is not able to connect to a cellular network.

The GPS tracker PCBA 58 (see FIG. 9) may also include a power management module 82 which may control the energy used by the GPS tracking system 10. The power management module 82 may also monitor the power levels from the vehicle connected power leads 84 and the voltage level of the rechargeable battery 38. The power management module 82 may interact with the microcontroller 76 to advise the energy status as well as receive instructions. By monitoring the incoming voltage levels from the connected leads 84, the power management module 82 may also control the illumination of the LEDs 42 in the taillight 14 used to indicate the brake and taillight functions. The rechargeable battery 38 may be a lithium-ion rechargeable battery. The rechargeable battery 38 may be connected to the power management module 82 and may receive a measured charging current whenever the power management module 82 is actively receiving power from the vehicle connected leads 84. By doing so, the rechargeable battery 38 is being charged when the running lights are on which is typically when the vehicle is being driven during nighttime. The rechargeable battery 38 is also being charged during the daytime because daytime driving frequently requires the brake lights. Accordingly whether the vehicle is being driven a long distance which is typically during nighttime or being driven a short distance which is typically during daytime, the rechargeable battery 38 is being recharged in order to power the GPS tracking system 10. The rechargeable battery 38 may also provide voltage and current back the power management module whenever the connected leads 84 of the vehicle are not supplying electricity due to the trailer 12 being untethered or the tail lights 14 are not switched on or there is no braking activity. In this mode, the power management module 82 will respond to instructions from the microcontroller 76 and retrieve energy from the battery 38 to feed back to the microcontroller 76 which in turn may selectively provide power to the other modules to ensure the GPS tracking system 10 continues operation in the appropriate mode as determined by the firmware.

Figure 9:
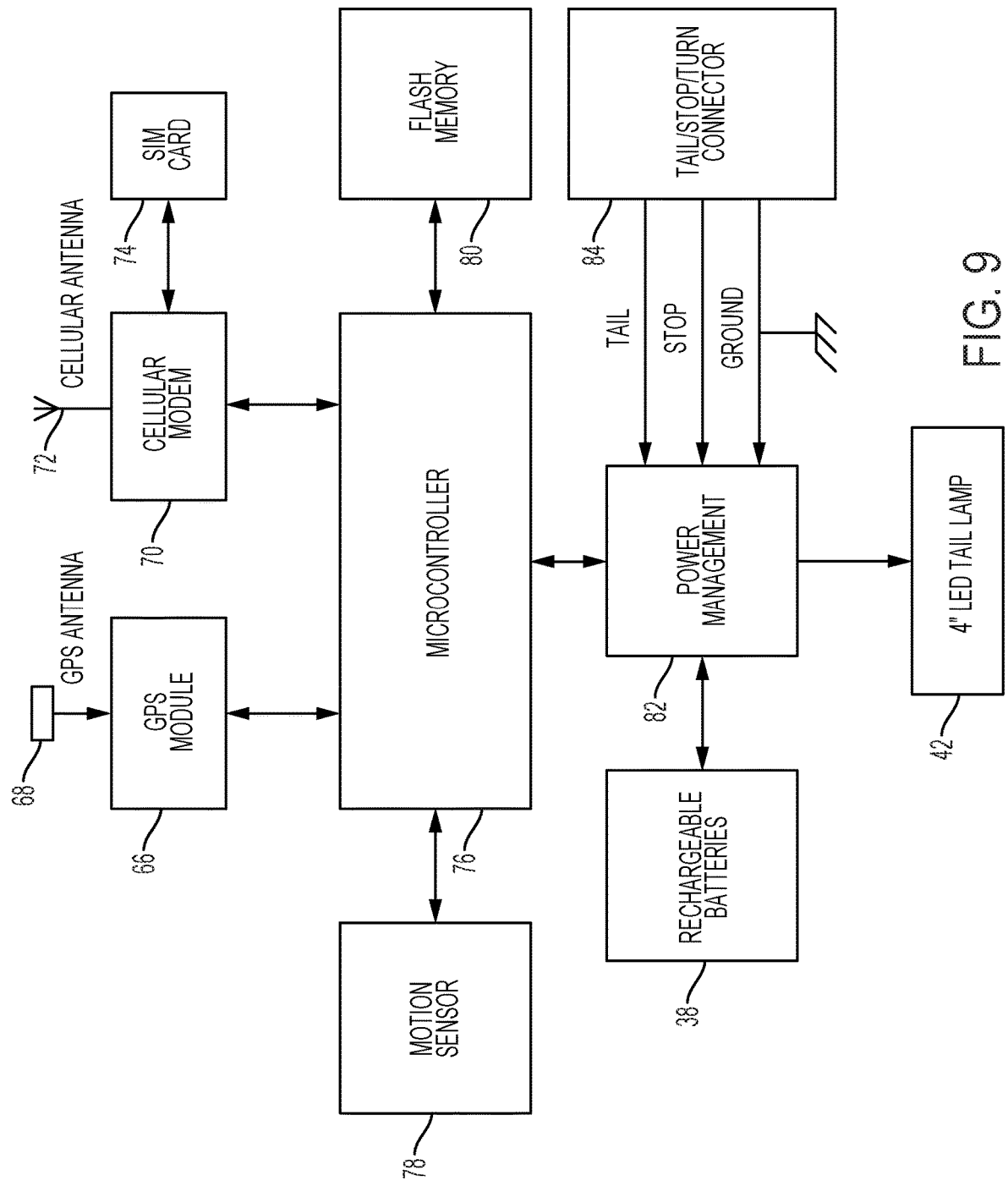
FIG. 9 illustrates a schematic diagram of the LED taillight and the integrated GPS tracking system.
Figure 10:
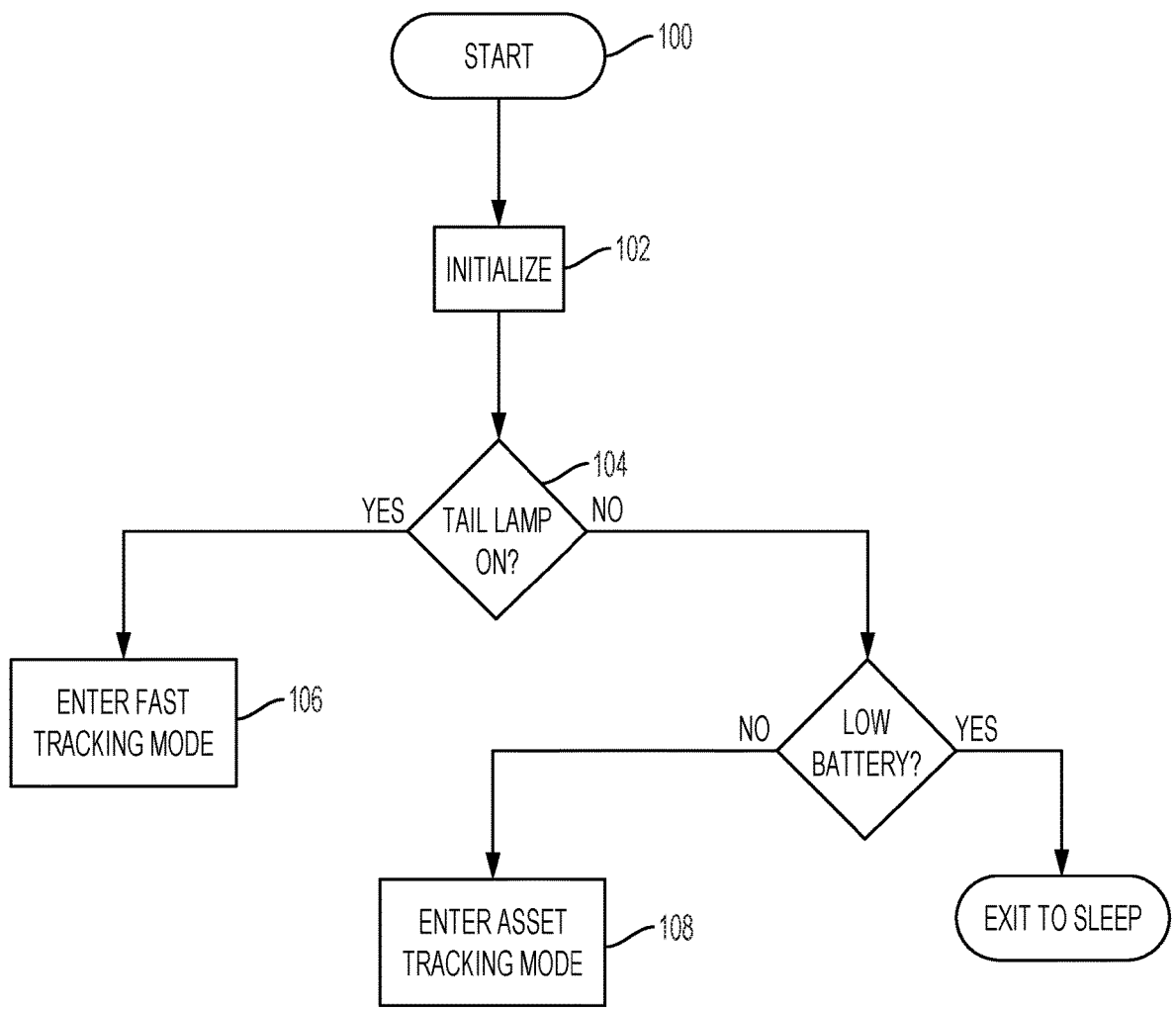
FIG. 10 illustrates software logic used to determine a state of the LED taillight and the GPS tracking system.
Figure 11:
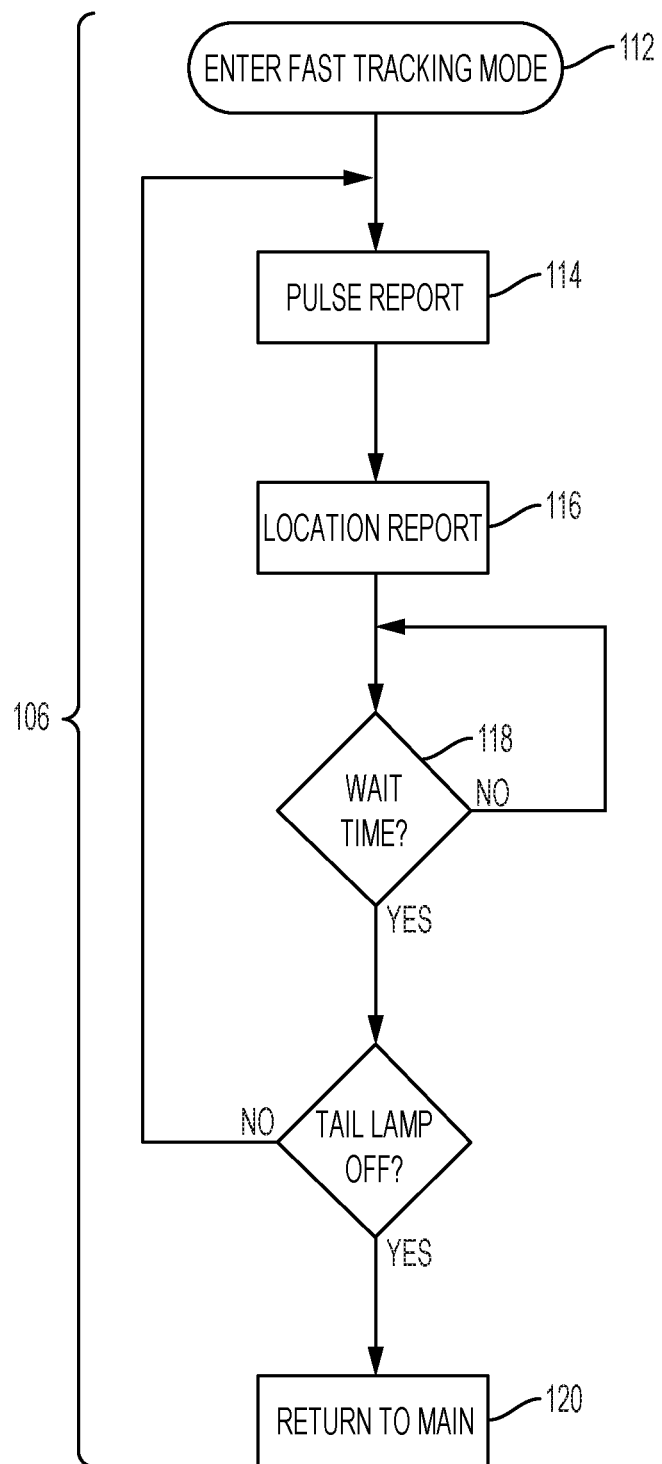
FIG. 11 illustrates software logic used to determine a reporting mode for the LED taillight and the GPS tracking system.
Figure 12:
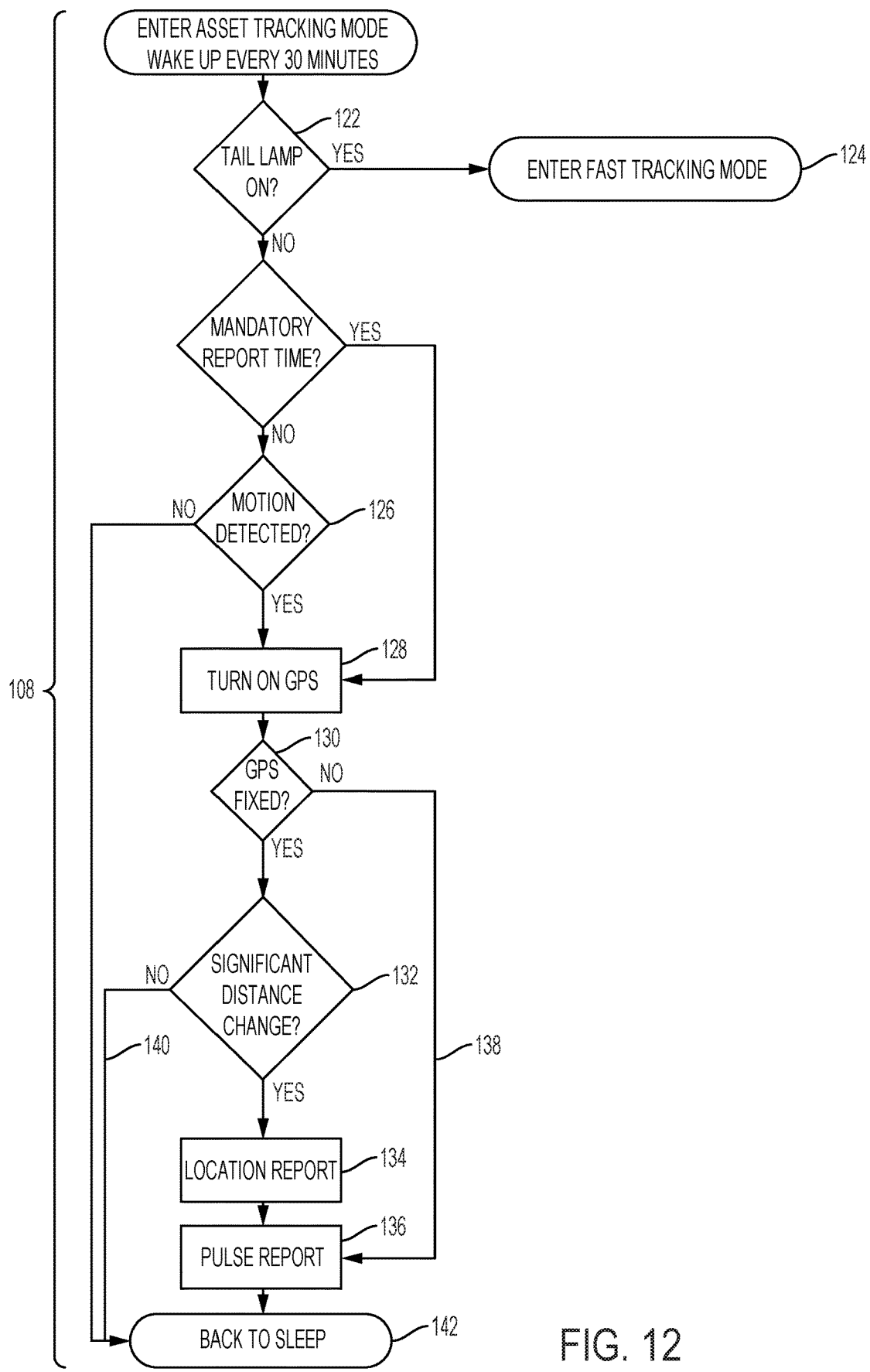
FIG. 12 illustrates software logic used to determine an alert status.

The firmware of the GPS tracking system 10 performs a number of discrete functions. High level logic of the firmware is represented by FIGS. 10-12. The start point 100 may represent when the GPS tracking system 10 is powered up either by 1) voltage being supplied via the vehicle connected leads 84 or 2) at least 3.4 volts DC being available from the rechargeable battery 38. While the battery 38 may have a nominal voltage value of 4.2 volts, the microcontroller 76 may continue to function until the available voltage falls beneath 3.4 volts. At 3.4 volts and in the absence of power from the vehicle connected leads 84, the microcontroller 76 may put all the other modules as shown in FIG. 9 'sleep' or 'low energy' mode. The microcontroller 76 may continue to monitor the available voltage and as it increases, it will commence to bring selected modules into 'work' or 'high energy' mode. Above 3.4 volts, the microcontroller 76 may initiate software routines which will activate the GSM and GPS modules bringing the GPS tracking system 10 into operational mode.

The step labelled 'Initialize' 102 may represent the situation where the available voltage to the microcontroller 76 is at least 3.4 volts. At this level, the microcontroller 76 may initiate its primary routines. The first primary routine 104 may determine whether there is voltage available from the vehicle connected leads 84, specifically the lead that provides voltage to the LEDs used as tail lamp illuminators. If there is sufficient voltage present, the microcontroller 76 may initiate Fast Tracking Mode 106. If the previous routine 104 determines that the vehicle voltage is not available, then the microcontroller 76 may measure the voltage level of the battery 38 and if the voltage level of the battery 38 is above 3.4 volts, the microcontroller 76 may initiate Asset Tracking Mode 108. If the voltage level of the battery 38 is less than 3.4 volts, the microcontroller 76 will enter a sleep mode 110 until either the connected vehicle leads 84 provide voltage or the voltage levels in the battery 38 exceed 3.4 volts.

When Fast Tracking Mode 106 is initiated 112 (see FIG. 11), the GPS module 66 and cellular modem 70 may be powered up and remain powered until this mode 106 is exited. While the GPS module 66 is acquiring a location fix, the microcontroller 76 transmits operational, performance, command and status information to the cellular modem 70 which may transmit this information called a Pulse report 114 using a UDP (User Datagram Protocol) to the back-end servers. When the GPS module 66 has acquired its location fix, the cellular modem 70 may transmit the location information called a location report 116 using the UDP to the back-end servers. The microcontroller 76 may also set the configurable frequency of the reports 114, 116 in Fast Tracking Mode 112 and enters a time loop 118 to wait until the next reporting event. The Power Management Module 82 may then be instructed to check the voltage level available from the vehicle connected leads 84 and transmits the value back to the microcontroller 76. If the microcontroller 76 determines that there is no power available from the vehicle connected leads 84, the microcontroller may terminate Fast Tracking Mode 106 and return to the first level startup routine 120.

For Asset Tracking Mode 108, the routine first checks 122 for voltage on the vehicle connected leads 84 and if present, this mode 108 is terminated by the microcontroller 76 and the Fast Tracking Mode 106 may be initiated 124 instead. The microcontroller 76 may use an internal timer to determine when to power up the GPS module 66 of the GPS tracking system 10. Also, while the timer is counting down, if the motion sensor module 78 detects motion 126, the microcontroller 76 may bypass the timer and power up 128 the GPS module 66 immediately. The GPS module 66 may have three modes; hot start, warm start and cold start. The hot start is when the GPS module 66 remembers its last calculated position and the satellites in view, the almanac used (information about all the satellites in the constellation), and the UTC Time. In this instance, the GPS module 66 makes an attempt to lock 130 onto the same satellites and calculate a new position based upon the previous information. This is the quickest GPS lock but it only works if the GPS module 66 is generally in the same location as when the GPS module 66 was last turned off. The warm start is when the GPS module 66 remembers its last calculated position, almanac used, and UTC Time, but not which satellites were in view. The GPS module 66 may then perform a reset and attempt to obtain the satellite signals and calculate a new position. If there is a significant change in distance 132, then the location report 134 and the pulse report 136 are transmitted to the server over the cellular modem. The receiver may have a general idea of which satellites to look for because it knows its last position and the almanac data helps identify which satellites are visible in the sky. This takes longer than a hot start but not as long as a cold start. The cold start is when the GPS module 66 dumps all the information, attempts to locate satellites and then calculates a GPS lock. This takes the longest because there is no known information as a significant period of time has passed since the last GPS session and any stored data would be worthless as the satellites used for a location last time would have continued in their orbits and passed out of range. If the GPS module 66 cannot fix a location 138 within the time period allocated by the microcontroller 76, only the Pulse report 136 is sent otherwise the new location is compared to the last stored location to determine whether a real location change has occurred 132. If no change is noted, the routine will end 140 otherwise if it is determined that a significant location change has occurred, the cellular modem will transmit the newly acquired location information using UDP to the back end servers. The Pulse report 136 is also sent to the back end servers and upon successful completion of the transmission, the microcontroller will initiate the timer and put the other modules into sleep mode 142 to conserver battery power.

The taillight 14 is shown and described as being a circular configuration. However, other configurations are also contemplating including but not limited to oval, triangular, rectangular or combinations thereof.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A global positioning satellite (GPS) tracking system for a vehicle, the system comprising:
   a cover sized and configured to fit a mounting member of rear light;
   a light emitting diode (LED) printed circuit board assembly (PCBA) fabricated from a material that is transparent to radio frequency electromagnetic waves, the LED PCBA disposed behind the cover;
   LEDs disposed immediately adjacent to the cover on the LED PCBA so that light from the LEDs is transmitted through the cover and projects the light through the cover when the LEDs emit light;
   electrical-conductive tracks formed on the LED PCBA for connecting the LEDs to a power source;
   a GPS tracker PCBA, which has a GPS antenna mounted on the GPS tracker PCBA, wherein the LEDs and the electrical-conductive tracks on the LED PCBA do not significantly overlap with the GPS antenna so as to facilitate reception of GPS signals;
   wherein the LEDs are directly connectable to the power source so that the LEDs work normally even if the GPS tracking system has a malfunction.

2. The system of claim 1 wherein a material of the LED PCBA is plastic, polyester or FR-4 epoxy glass.

3. The system of claim 1 wherein the LEDs and the electrical-conductive tracks overlap the GPS antenna less than 50 percent of a surface area of the GPS antenna.

4. The system of claim 1 wherein the LEDs and the electrical-conductive tracks overlap the GPS antenna less than 5 percent of a surface area of the GPS antenna.

5. The system of claim 1 wherein the LEDs and the electrical-conductive tracks do not overlap a surface area of the GPS antenna.

6. The system of claim 1 further comprises a 3 pin connector in electrical communication with a rechargeable battery and connectable to a corresponding 3 pin connector of a vehicle, a first pin electrically connectable to a tail light pin and a second pin connectable to a brake light of the tail light pin so that the rechargeable battery is recharged when a taillight is turned on or when the vehicle trailer is braking.

7. A taillight for a vehicle with an integrated global positioning satellite (GPS) tracking system self-containable within a rear light socket of the vehicle, the taillight comprising:
   a cover sized and configured to fit a rear socket of a rear light;
   a light emitting diode (LED) disposed immediately adjacent to the cover on a LED printed circuit board assembly (PCBA) so that light from the LED is transmitted through the cover and projects a light when the LED emits light;
   a GPS tracker PCBA, which has a GPS antenna mounted on the GPS tracker PCBA, wherein the LED and electrical-conductive tracks on the LED PCBA do not significantly overlap with the GPS antenna so as to facilitate reception of GPS signals;
   wherein the LED is directly connected to a power source so the LED works independently of the GPS tracking system; and
   wherein the taillight and the GPS tracking system fits within the rear light socket of the rear light.

8. The taillight of claim 7 wherein a material of the LED PCBA is plastic, polyester or FR-4 epoxy glass.

9. The taillight of claim 7 wherein the LEDs and the electrical-conductive tracks overlap the GPS antenna less than 50 percent of a surface area of the GPS antenna.

10. The taillight of claim 7 wherein the LEDs and the electrical-conductive tracks overlap the GPS antenna less than 5 percent of a surface area of the GPS antenna.

11. The taillight of claim 7 wherein the LEDs and the electrical-conductive tracks do not overlap a surface area of the GPS antenna.

12. The taillight of claim 7 further comprising a 3 pin connector in electrical communication with a rechargeable battery and connectable to a corresponding 3 pin connector of the vehicle trailer, a first pin electrically connectable to a tail light pin and a second pin connectable to a brake light of the tail light pin so that the rechargeable battery is recharged when the taillight is turned on or when the vehicle trailer is braking.

13. A trailer for a vehicle, the trailer comprising:
   a plurality of wheels and a platform with the plurality of wheels attached to the platform;
   passenger side and driver side rear light cavities that are non-transparent to radio frequency electromagnetic waves;
   first and second mounting members disposed within the passenger side and driver side rear light cavities;
   a covert global positioning (GPS) tracking system mounted to either of the passenger side or driver side rear light cavities via the first or second mounting members, the covert GPS tracking system including:
a cover sized and configured to fit the first or second mounting member;
a light emitting diode (LED) printed circuit board assembly (PCBA) fabricated from a material that is transparent to radio frequency electromagnetic waves, the LED PCBA disposed behind the cover;
LEDs disposed immediately adjacent to the cover on the LED PCBA so that light from the LEDs is transmitted through the cover and projects a light when the LEDs emit light;
electrical-conductive tracks formed on the LED PCBA for connecting the LEDs to a power source;
a GPS tracker PCBA, which has a GPS antenna mounted on the GPS tracker PCBA, wherein the LEDs and the electrical-conductive tracks on the LED PCBA do not significantly overlap with the GPS antenna so as to facilitate reception of GPS signals;
wherein the LEDs are directly connected to power source so the LED works independently with the covert GPS tracking system;
the trailer further comprises a rear light mounted to the other one of the passenger side or driver side rear light cavities via the other one of the first or second mounting members.

14. The trailer of claim 13 wherein the rear light has an identical external configuration compared to the covert GPS tracking system mounted on the other side of the trailer.

15. The trailer of claim 13 wherein the covert GPS tracking system further includes a 3 pin connector in electrical communication with a rechargeable battery and connectable to a corresponding 3 pin connector of the trailer, a first pin electrically connectable to a tail light pin and a second pin connectable to a brake light of the tail light pin so that the rechargeable battery is recharged when a taillight is turned on or when the trailer is braking.

16. The trailer of claim 13 wherein a material of the LED PCBA is plastic, polyester or FR-4 epoxy glass.

17. The trailer of claim 13 wherein the LEDs and the electrical-conductive tracks overlap the GPS antenna less than 50 percent of a surface area of the GPS antenna.

18. The trailer of claim 17 wherein the LEDs and the electrical-conductive tracks overlap the GPS antenna less than 5 percent of a surface area of the GPS antenna.

19. The trailer of claim 18 wherein the LEDs and the electrical-conductive tracks do not overlap a surface area of the GPS antenna.

* * * * *